W. ALDRICH.
TURNING LATHE.
No. 9,616. Patented Mar. 15, 1853.
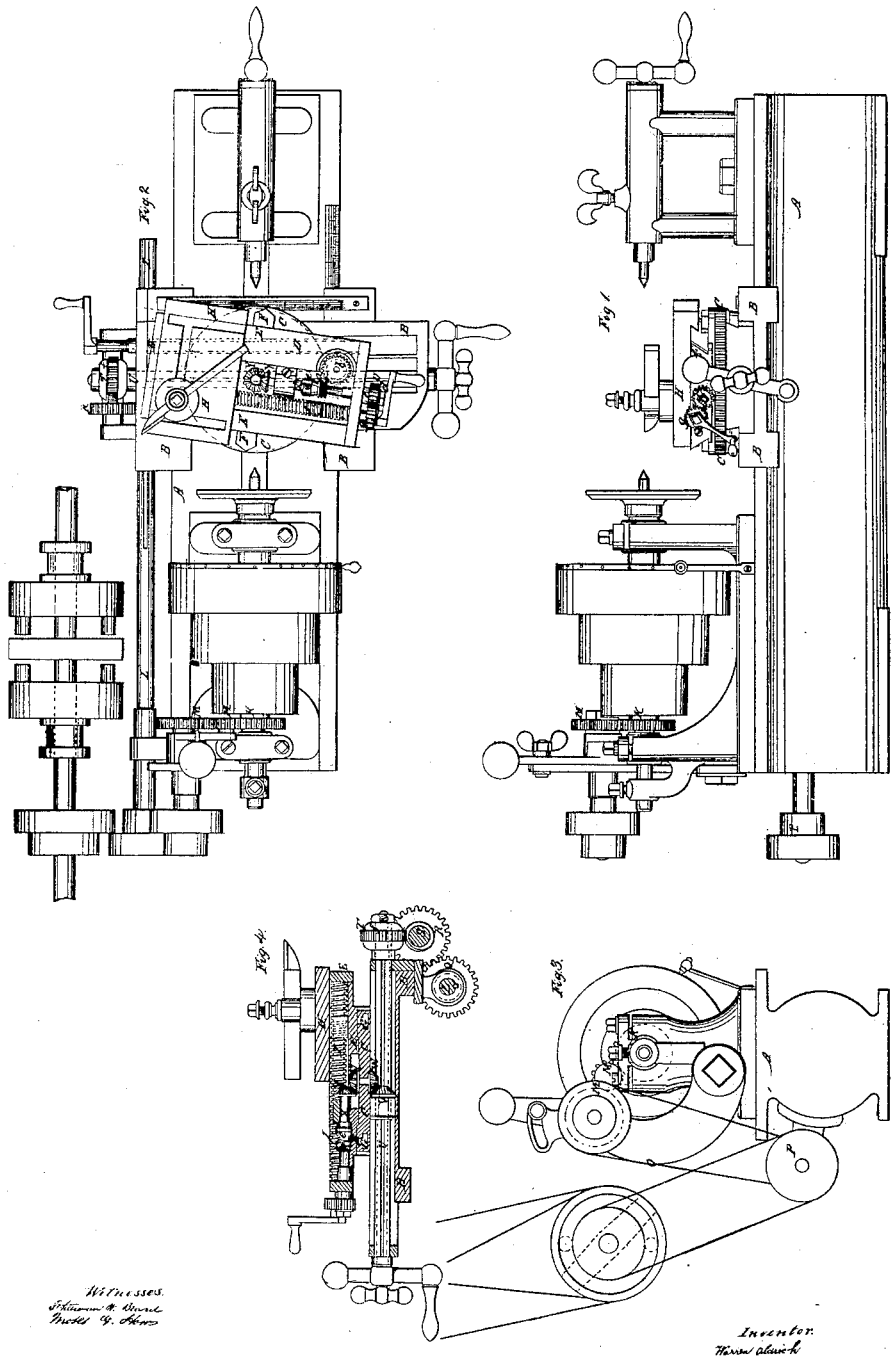

UNITED STATES PATENT OFFICE.

WARREN ALDRICH, OF LOWELL, MASSACHUSETTS.

TURNING-LATHE.

Specification of Letters Patent No. 9,616, dated March 15, 1853.

*To all whom it may concern:*

Be it known that I, WARREN ALDRICH, of Lowell, in the county of Middlesex and State of Massachusetts, have invented certain new and useful Improvements in Turning-Lathes, and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1 is a side elevation of the lathe. Fig. 2 is a plan of the same. Fig. 3 is an end view. Fig. 4 is a section of the tool carriage.

The object of my improvements is to construct an apparatus by means of which a variety of different forms, such as globes, ovals, etc., can be readily and accurately turned on the same lathe. To effect this result, the tool carriage, in which the tool is placed, is susceptible of a variety of motions and adjustments, by which it can be moved in any direction necessary to the production of peculiar forms and adjusted in any desired position with regard to the center line of the lathe. This arrangement is also so contrived that the tool carriage can be moved by hand or be fed by the gears of the lathe.

A A in the drawings represents the bed piece of the lathe, on which moves the slide B B, which sustains the whole apparatus of the tool carriage. To this slide B B is attached the circular plate C C, which can be moved forward and back on the slide B B, at right angles with the bed piece A A, by means of the screw D D, shown by dotted lines in Fig. 2. On the circular plate C C is placed the revolving slide E E, which is arranged so as to revolve on the plate C C, or be fastened in any desired position to the same, by means of bolts, which, when the nuts F, F on the same are loosened, slide in the annular groove G G of the plate C C. On the slide E E is placed the tool carriage H H which is moved forward and back on the same by the screw I I, as will be hereinafter explained.

For the production of various ornamental forms, as hereinbefore suggested, a motion which is the result of both a longitudinal and circular motion is imparted to the tool as follows: Motion is communicated from the gear K on the center shaft of the lathe to the grooved shaft L L, through the gears M M, band O, and pulley P. On the shaft L L is placed the gear Q, a shoulder in the journal of which slides in the groove of the shaft L L when the position of the slide B B on the lathe is altered. The gear Q gives motion to the gear R, on the shaft of which is an endless screw S, which engages with the teeth of the gear T, on the end of the grooved shaft U, which extends through the length of the slide B B. From the shaft U motion is given to the tool carriage H H as follows: A shoulder or feather in the journal of the bevel gear V, fits into a corresponding groove of the shaft U. The teeth of this wheel V engage with those of the bevel gear W, from which motion is given to the shaft X through the bevel gears Y, Y. On the shaft X is the endless screw $a$, which gives motion to the gear $b$, the teeth of which engage with and travel in the teeth on the edge of the circular plate C C. By this means, the nuts F F, before referred to, being loosened, the carriage E E and consequently the tool carriage H H is made to revolve. A longitudinal motion is also given to the tool carriage H H by means of the screw I I, attached to the underside of the same, as hereinabove suggested, this screw being turned by means of the gear $g$, which engages with the gear $c$ on the end of the shaft X. By this means the tool carriage will be fed along on the carriage E E as the said carriage E E revolves. The tool carriage, after being placed in any desired position, can have a circular motion alone imparted it by unscrewing the nut $d$ on the end of the shaft X, so that the gear $c$, which is placed loosely on the said shaft, cannot revolve, and consequently no motion will be imparted to the feeding screw I I. A longitudinal motion alone, at any desired angle with the bed piece A A, can be imparted to the tool carriage by disconnecting the endless screw $a$ from the gear $b$, the said endless screw being attached to a sliding box $e$ fastened to the shaft X by a set screw.

The gear T is held fast by the friction disk $f$, which is loosened or tightened by a screw on the end of a rod which passes through the hollow shaft U. When this disk $f$ is loosened, the shaft U does not revolve, the gear T being loose on the said shaft, but can be turned by hand by means of a crank on its end, and thus give the required motions to the tool carriage.

By the above described arrangement it will be seen that either a longitudinal motion at any angle or a circular motion, or both motions at the same time can be imparted to the tool, by which motions various ornamental forms and angles can be produced, and also that the said motions can be effected while the tool carriage is adjusted in any desired position with regard to the center line of the lathe by means of the sliding circular plate C C, which sustains the whole tool carriage and is fed along when desired by the screw D D, the whole apparatus being kept in gear as the tool carriage is moved, as hereinabove set forth.

I am aware that self acting lathes have been constructed for turning spherical and barreling forms, and solid cones or hollow cones by moving the tool carriage by hand, but these results are by my improved lathe easily and accurately effected by a combination of devices which gives an automatic motion to the tool carriage and constitutes an essential improvement upon the English or other self-acting lathes which have been devised.

Having thus described my improvements in turning lathes, I shall state my claim as follows:

What I claim as my invention and desire to have secured to me by Letters Patent is—

The improvement hereinabove described, which consists in giving an automatic motion to the upper slide or tool rest, when set at any angle to the bed piece of the lathe, instead of moving it by hand, so as to turn with ease and accuracy solid or hollow cones as above set forth, by means substantially of the screw I I, revolving worm shaft X and revolving plate C C, as above set forth.

WARREN ALDRICH.

Signed in our presence:
  ITHAMAR W. BEARD,
  MOSES G. HOW.